Feb. 11, 1969   N. E. TORNQVIST ET AL   3,427,425
METHOD OF APPLYING PREFERABLY BAND-SHAPED METAL PARTS WITH GOOD
MECHANICAL ADHESION TO A METAL FRAME COATED WITH
INSULATING, PREFERABLY CERAMIC MATERIAL
Original Filed May 1, 1964

INVENTORS
Nils Erik Tornqvist
Sven Olof Sören Stark

BY Pierce, Schiffler & Parker
ATTORNEYS

INVENTORS
Nils Erik Tornquist
Sven Olof Sören Stark

BY Pierce, Scheffler & Parker
ATTORNEYS 3,427,425
METHOD OF APPLYING PREFERABLY BAND-SHAPED METAL PARTS WITH GOOD MECHANICAL ADHESION TO A METAL FRAME COATED WITH INSULATING, PREFERABLY CERAMIC MATERIAL
Nils Erik Tornqvist and Sven Olof Soren Stark, Lund, Sweden, assignors to AB Tetra Pak, Lund, Sweden, a Swedish company
Continuation of application Ser. No. 364,225, May 1, 1964. This application Feb. 23, 1968, Ser. No. 708,431
Claims priority, application Sweden, May 16, 1963, 5,413/63; Mar. 5, 1964, 2,715/64
U.S. Cl. 219—78     1 Claim
Int. Cl. B23k 19/00

ABSTRACT OF THE DISCLOSURE

A flexible metal strip such as an electrical resistance heating element is adhesively attached to a ceramic insulating coating on a rigid metal support by simultaneously pressing the strip against said coating and heating it by passing electric current through it.

---

This application is a continuation of Ser. No. 364,225, filed May 1, 1964, now abandoned.

The present invention relates to a method of applying preferably band-shaped metal parts with good mechanical adhesion to a metal support body coated with insulating, preferably ceramic material.

In the present art the problem of securing metal objects in such a way as to insulate them from a support body will sometimes materialize. This is the case for instance with so-called heat sealing jaws, i.e. sealing means intended to seal thermoplastic materials by means of heat and pressure.

A sealing means of the kind mentioned above generally consists of a pair of cooperating sealing jaws which can be pressed against each other and of which one at least is provided with so-called heat bands, i.e. thin metallic bands of electric resistance material, which are heated by passing an electric current through the bands. As it is desirable for various reasons that the heat bands of the sealing jaws have a small heat capacity, they should be thin, so that heat can easily dissipate. However, as thin heat bands lack rigidity, they have to be disposed on a plane backing or support against which the bands may rest when they are being pressed during the sealing operation against the thermoplastic material intended for sealing.

The heat sealing jaws which occur most frequently at present essentially consist of a metallic body serving as a backing for the heat bands and on which an insulating plate of e.g. steatite is disposed in such a way that the heat bands are insulated from the metallic support body. The heat bands are not fixed to the steatite plate throughout their length but are merely stretched across it and are securely fixed at their ends to the plate at insulated fixing points.

The drawback of these heat jaws is that the heat bands are extended when heated, and for this reason a current pulse cannot be led through the heat bands if the jaw is not pressed against an object to be sealed or against a backing or support of another kind.

In practice it has turned out that the heat bands, even though the sealing jaw is pressed against an object to be sealed, may rise locally from the backing and may be thermally insulated in such a way that the band may be burnt off at this place. Furthermore, repeated bending movements by the band may cause fatigue rupture.

These drawbacks become especially prominent because seals made in accordance with the modern art are often made by means of quick heat pulses which have to be carefully balanced with regard to both duration and intensity. Heating jaws having loosely mounted heat bands will not, however, have sufficiently well-defined thermal properties for impulse sealing since the heat dissipation of the heat bands is dependent both on the force with which the heat bands are pressed against the backing and on insulating or heat dissipating impurities, if any, which may enter between the heat bands and the underlaying insulating layer.

In order to bring about good adhesion between metal parts, such as heat bands of electric resistance metal such as Invar, and an insulating surface of e.g. a sintered metal oxide, it is suggested according to the invention that the said metal portions of the desired configuration are disposed on the surface of the face ground metal oxide and are pressed with considerable force against said surface, at the same time as an electric current of high intensity is led through the metal bands, which are thereby heated to a high temperature.

Further particulars and advantages of the invention will be apparent from the accompaning drawing showing an embodiment of the invention chosen by way of example and where:

As previously mentioned heat sealing jaws are an important field within which the invention may be used to advantage and the invention will be described on the presumption that the band-shaped metal portions to be attached to the insulating backing consist of heat bands of resistance material and that the final product aimed at is a heat sealing jaw.

Figure 3:
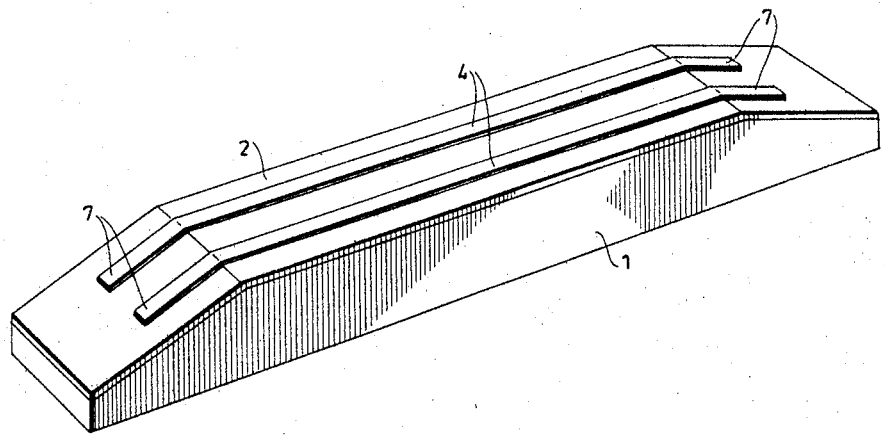
Figure 4:
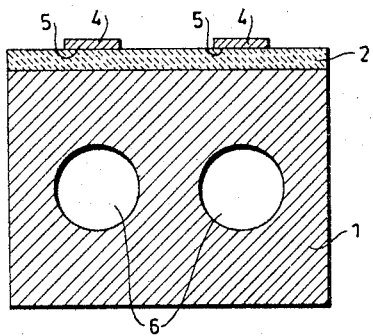

FIGS. 3 and 4 show a face ground metal support body 1 of steel which is given a desired shape and provided with the necessary cooling passages 6, whereupon the metal support body 1 is coated in a known manner by flame spraying with an insulating, preferably ceramic material layer 2, e.g. sintered chromium oxide, which is marketed under the commercial name Rokide C. The top surface of the Rokide C layer 2 is then ground so as to form a plane and dense surface on which thin bands of a metallic resistance material are disposed.

When the heat bands 4 have been disposed in the desired position on the body coated with sintered chromium oxide the body is mounted in a press. The heat bands 4, which consist of resistance material, are connected at their ends 7 to a source of current which is adapted to give off brief current pulses of high intensity. Between the heat bands and the jaws of the press there are disposed on one hand a mica disc in order to insulate the heat bands 4 electrically from the press and on the other a rubber-coated steel plate, whose purpose is to distribute the pressing force evenly over the surface of the heat bands.

The heat bands 4 are pressed against the coating 2 applied on the metal support body 1 with a pressure of about 42,500 lbs./sq. in., at the same time as a powerful current pulse is allowed to pass through the heat bands 4, which are thereby heated briefly and become soft and, due to the high contact pressure against the chromium oxide coating, are bonded chemically to said coating or become alloyed therewith in a contact zone 5. By varying the composition of the metal oxide and the temperature of the heat bands it is, of course, possible to obtain good anchoring results with a varying pressure e.g. 7100–71,000 lbs./sq. in. but the figure 42,500 lbs./sq. in. indicated above has turned out to be advantageous in the combinations of material mentioned in this embodiment.

Figure 1:
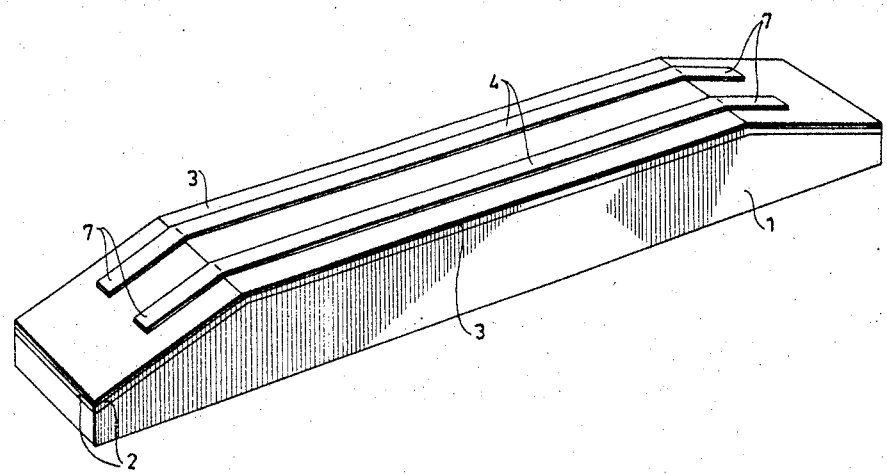
FIGS. 1 and 3 are perspective views of heat sealing jaws.
Figure 2:
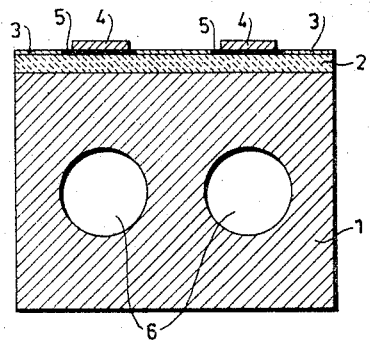
FIGS. 2 and 4 show sections through the same heating jaws.

Another method in accordance with the invention illustrated in FIGS. 1 and 2 is characterized in that the surface of the metal oxide layer in a known manner is coated with a thin metal layer on the surface of which said metal bands are disposed in a desired configuration, and that the metal bands are arranged to be welded to said metal layer by heating the metal bands to a high temperature at the same time as they are pressed against the metal coated oxide layer.

When producing this heat sealing jaw (shown in FIGS. 1 and 2) a face ground steel support body 1 is given the desired shape and provided with cooling passages 6, whereupon the metal support body 1 is coated by flame spraying with an insulating, preferably ceramic material layer 2, e.g. sintered aluminium oxide which is marketed under the commercial name Rokide A. The surface of the aluminium oxide layer 2 thereafter is ground and in a known manner coated with a thin metal coating 3 e.g. nickel, having a good adherence to the underlying Rokide A surface.

The method of coating a ceramic surface with a nickel layer thereby obtaining an excellent adherence between them is previously known through the Swedish Patent No. 153,976.

When the heat bands 4 have been disposed in the desired position on the metal coated oxide layer 2–3 the support body 1 is mounted in a press. The heat bands 4, which consist of resistance material, are connected at their ends 7 to a source of current which is adapted to give off brief current pulses of high intensity. Between the heat bands and the jaws of the press there are disposed on one hand a mica disc in order to insulate the heat bands 4 electrically from the press and on the other a rubber-coated steel plate, whose purpose is to distribute the pressing force evenly over the surface of the heat bands.

The heat bands 4 are pressed against the nickel coating 3 on the oxide layer 2 applied on the metal support body 1 with a pressure of about 14,500–42,500 lbs./sq. in. at the same time as a powerful current pulse is led through the heat bands 4 which are thereby heated briefly and become soft due to the high contact pressure against the nickel coating which are welded together in a zone 5.

The heat sealing jaw is, after the mentioned operation, ready for use as a heat sealing jaw.

The heating jaw made in accordance with the invention has great advantages as compared to known sealing jaws, since it has well-defined thermal properties and such a good adhesion between the heat bands and the backing that a current pulse may be allowed to pass through the heat bands without the latter being pressed against any backing. This latter possibility is of importance in cases where the heat jaw adheres to the object to be sealed after the sealing operation and has a short detaching pulse supplied to it when being removed from the object to be sealed, in order to cancel the adhesion between the object to be sealed and the sealing jaw by local surface heating. An additional advantage of the method according to the invention is that the metal body of the heat jaw is not heated to any considerable extent during the fixing of the heat bands, whereby heat tensions in the metal body are avoided and the formation of oxide on the metal surface is prevented.

We claim:

1. The method of producing a heat-sealing jaw which comprises the steps of applying an adhering ceramic layer in the form of sintered chromium oxide to one face of a metallic support body, positioning at least one metallic band of electric resistance material on the surface of said ceramic layer, connecting the opposite ends of said metallic band to a source of current thereby to cause an electric current to pass through said metallic resistance band from one end thereof to the other to heat the same to its softening point, and simultaneously applying a pressure of about 42,500 lbs./sq. in. to said metallic resistance band to cause the same to become adhered to said ceramic layer.

References Cited

Texas Instruments Incorporated: Parallel Gap Welding, by Richard P. Bywaters (SP22–A62), Nov. 1, 1962.

RICHARD M. WOOD, *Primary Examiner.*

BARRY A. STEIN, *Assistant Examiner.*

U.S. Cl. X.R.

29—472.5